(12) United States Patent
Rakic

(10) Patent No.: US 12,695,636 B2
(45) Date of Patent: Jul. 28, 2026

(54) PROOF OF DATA RETENTION WITH BLOCKCHAIN

(71) Applicant: TAAL DIT GmbH, Zug (CH)

(72) Inventor: Dean Rakic, Zug (CH)

(73) Assignee: TAAL DIT GMBH, Zug (CH)

( * ) Notice: Subject to any disclaimer, the term of this patent is extended or adjusted under 35 U.S.C. 154(b) by 121 days.

(21) Appl. No.: 18/843,024

(22) PCT Filed: Mar. 1, 2023

(86) PCT No.: PCT/EP2023/055135
§ 371 (c)(1),
(2) Date: Aug. 30, 2024

(87) PCT Pub. No.: WO2023/166031
PCT Pub. Date: Sep. 7, 2023

(65) Prior Publication Data
US 2025/0184163 A1 Jun. 5, 2025

(30) Foreign Application Priority Data
Mar. 1, 2022 (GB) ...................................... 2202805

(51) Int. Cl.
*H04L 9/00* (2022.01)
*G06F 21/64* (2013.01)
*H04L 9/30* (2006.01)

(52) U.S. Cl.
CPC ................ *H04L 9/50* (2022.05); *G06F 21/64* (2013.01); *H04L 9/30* (2013.01)

(58) Field of Classification Search
CPC .............. H04L 9/50; H04L 9/30; G06F 21/64
USPC .............................................................. 726/1
See application file for complete search history.

(56) References Cited

U.S. PATENT DOCUMENTS

| | | | | |
|---|---|---|---|---|
| 11,403,558 B1 * | 8/2022 | Shorter | ..................... | G06F 8/60 |
| 12,192,364 B1 * | 1/2025 | Mullaney | .............. | H04L 9/3218 |
| 2018/0349621 A1 * | 12/2018 | Schvey | ................ | H04L 9/3236 |
| 2019/0058580 A1 * | 2/2019 | Tormasov | ............ | H04L 9/3239 |
| 2020/0021649 A1 * | 1/2020 | Natanzon | ............ | H04L 67/1095 |
| 2020/0159697 A1 | 5/2020 | Wood et al. | | |
| 2020/0234375 A1 * | 7/2020 | Natanzon | .............. | G06F 21/645 |
| 2021/0141698 A1 | 5/2021 | Bourgeois et al. | | |

* cited by examiner

*Primary Examiner* — Teshome Hailu
(74) *Attorney, Agent, or Firm* — ALLEN, DYER, DOPPELT, + GILCHRIST, P.A. Attorneys at Law

(57) ABSTRACT

A computer-implemented method of using a blockchain to provide proof of a data retention policy, wherein a smart contract defines one or more respective data retention requirements for storing data items at a storage location, and wherein the method comprises: receiving a data item and/or an encrypted version thereof, and one or more data retention details of a retention policy; supplying, to a smart contract, the data item and/or the encrypted version thereof, and the data retention details; and executing the smart contract, wherein the smart contract is configured to, when executed: determine whether the data retention details satisfy the data retention requirements; and if so, submit a transaction to the blockchain, wherein the transaction comprises the data retention details and at least one of: the data item, the encrypted version thereof, a reference to where to the data item is stored at the storage location.

16 Claims, 4 Drawing Sheets

PROOF OF DATA RETENTION WITH BLOCKCHAIN

TECHNICAL FIELD

The present disclosure relates to a method of using a blockchain to provide proof of a data retention policy.

BACKGROUND

A data retention policy, or a records retention policy defines how data should be stored for the purpose of operational or regulatory compliance. The data retention policy is typically part of an overall data management strategy of an organization, e.g. company, government body, etc. Such policies are becoming more important because of the increased amounts of data that organisations are required to store and process. Data retention policies are therefore needed to define how long an organization must retain certain data, to prevent data from being stored indefinitely. With such a focused digital strategy and the application of retention protocols, organizations also control how data is stored for compliance or regulatory reasons, as well as how data will be disposed of after it is no longer needed. The data retention policy typically contains an explanation of the different types of data and records to be stored, explanations on the formatting of the data, the retention period, as well as a description of the system on which the data will be stored. The elements included in the policy are usually based on the rules of the regulatory body that manages the industry. The retention policy sometimes specifies that historical data should be preserved after the end of the period of use, e.g. by archiving to a tertiary data warehouse. Organizations must demonstrate that they perform selective retention and deletion of data in accordance with the specific regulatory requirements of their industry.

Additional requirements are often set by the implementation of the General Data Protection Regulation (GDPR) when the information to be stored includes personal data. The GDPR requires organisations to prove that personal data is properly managed and how it stored throughout its life cycle, and especially at the end. Observed by end users, non-compliance with these provisions can lead to the imposition of significant fines on organizations.

SUMMARY

Existing techniques for storing data retention policies suffer from several problems and can be difficult for the purposes of retrieving data. This is especially complicated if data destruction has occurred.

One problem is access to data. Available access to information, both current and old, has already become a challenge. Fast-growing amounts of data make finding individual data records a difficult task. Another problem is cost. Although the cost of data storage generally decrease, there are other factors in the overall cost of storing data. For instance, the cost of labor to find and retrieve data should also be taken into account. Also added is the cost of the infrastructure, migration costs, and specialist archiving. Another problem is one of risk. As data has to be stored somewhere, there is a dependence on the ability of the storage provider to safely store the data. Data breaches due to inadequate data policies are a burden for most organisations, as they cause direct loss of revenue, damage reputation and often incur large fines.

Current systems for managing a data retention policy at the data file level is roughly akin to a decentralized system in the sense that the retention process is in many cases beyond the control of IT departments and uncontrolled by management, and the links between the various parties in the system can be very poorly established. In the case of a more structured retention policy, it is currently the case that the data is stored only by the relevant party in the organization or regulatory body. This in turn describes a centralized rather than a decentralized approach.

There is therefore a need for a fully decentralised approach to managing data retention policies that can be easily implemented by organisations and which is transparent to all parties involved.

According to a first aspect disclosed herein, there is provided a computer-implemented method of using a blockchain to provide proof of a data retention policy. A smart contract defines one or more respective data retention requirements for storing data items at a storage location. The method comprises receiving, from a party, a) a first data item and/or an encrypted version of the first data item, wherein the first data item is to be stored at the storage location, and b) one or more respective data retention details of a first retention policy relating to the first data item. The method further comprises supplying, to the smart contract, a) the first data item and/or the encrypted version of the first target data item, and b) the one or more respective data retention details of the first retention policy. The smart contract is executed. When executed, the smart contract is configured to determine whether the one or more respective data retention details of the first retention policy satisfy the one or more respective data retention requirements. If the one or more respective data retention details the first retention policy are determined to satisfy the one or more respective data retention requirements, the smart contract is configured to submit a first blockchain transaction to the blockchain. The first blockchain transaction comprises the one or more data retention details of the first retention policy and at least one of: i) the first data item, ii) the encrypted version of the first data item, iii) a reference to where to the first data item is stored at the storage location.

A retention policy provider (e.g., a blockchain node) operates a smart contract, i.e., self-executable code. The smart contract defines a set of data retention requirements. The data retention requirements specify information which must be provided in order for a retention policy to be issued for the storage of a data item (data item is used generally to refer to any type of data). For instance, the smart contract may require a file type and/or format of the data to be stored, a storage location of the data, an effective date after which the data is to be deleted, a retention period, etc. The data item is sent to one or more storage providers. A party (e.g., a user or group, such as an organisation) sends a data item and/or an encrypted version of the data item to the provider. Also sent are one or more data retention details, one for each data retention requirements specified by the smart contract. The one or more data retention details form a data retention policy for the data. The data retention details, and the data item (or encrypted data item) are supplied to the smart contract. The smart contract verifies that the supplied data retention details meet the requirements, and if so, the smart contract sends a transaction to the blockchain. The transaction includes the data retention policy. The transaction may also include the data item or the encrypted data item. Additionally, or alternatively, the transaction may include a reference to the storage location of the data item.

Using the blockchain to record data retention policies has several benefits. First, the policies can be accessed at any time since the decentralised network does not suffer from any downtime. Access to the policies is location-independent, providing worldwide access. There is no single person or entity responsible for storing the policies, which makes it difficult (or even impossible) for the policies to be manipulated by third parties. Immutable links between the data and the associated retention policy are created, meaning that the retention policy for a given data record cannot be disputed.

BRIEF DESCRIPTION OF DRAWINGS

To assist understanding of the present disclosure and to show how embodiments may be put into effect, reference is made by way of example to the accompanying drawings in which.

DETAILED DESCRIPTION

Example Blockchain System

Figure 1A:
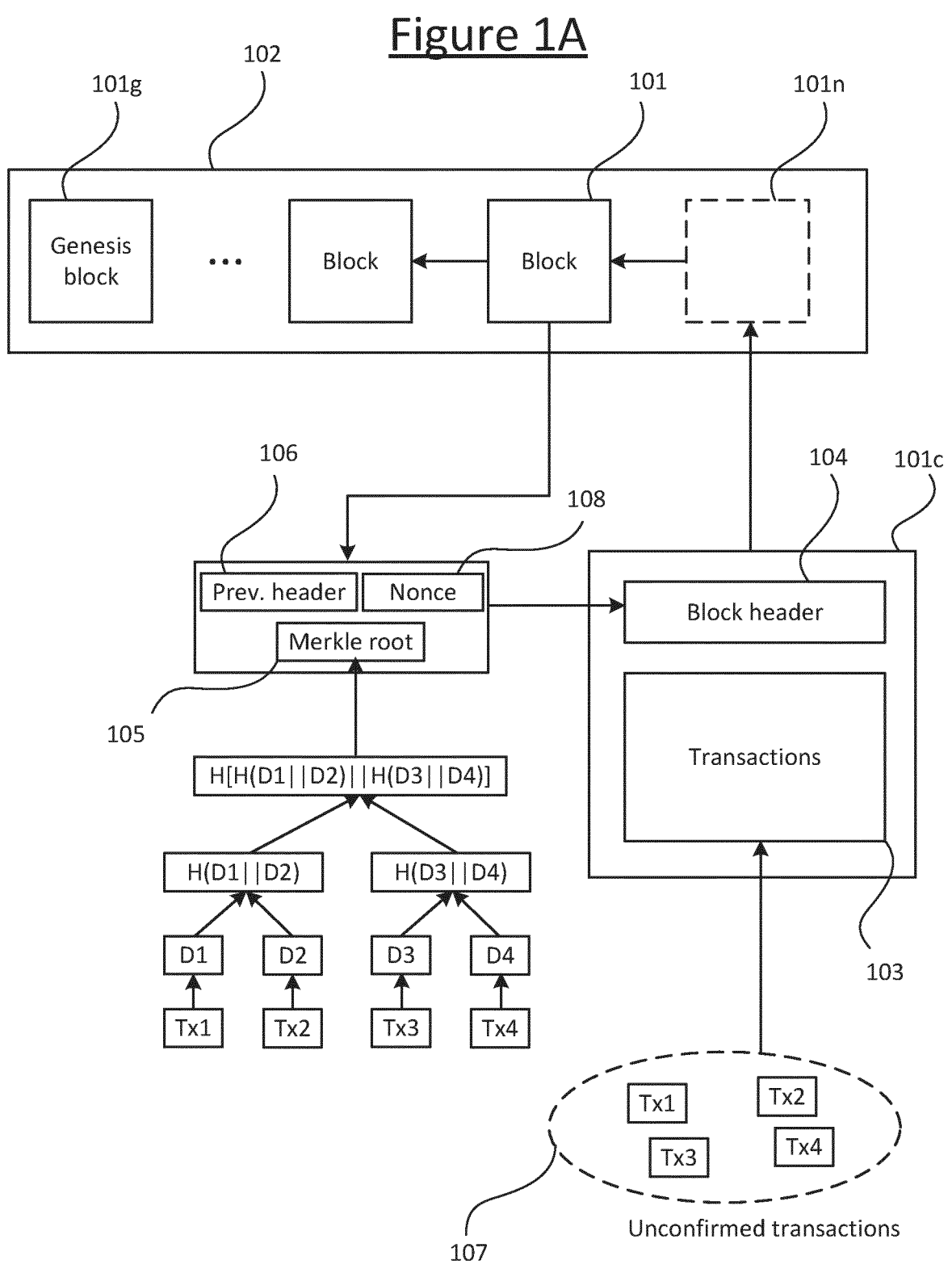
FIG. 1A schematically illustrates an example method for mining a new block to a blockchain, FIG. 1B schematically illustrates a pair of blockchain transactions, FIG. 2 schematically illustrates an example system for recording a data retention policy on the blockchain, and FIG. 3 schematically illustrates an example process for recording a data retention policy on the blockchain.

FIG. 1A schematically illustrates an example method for mining a new block $101n$ on a blockchain 102. A blockchain 102 is a form of distributed database (or ledger) that acts as a record of all valid transactions 103 that have ever been transmitted to the blockchain network.

Figure 1B:
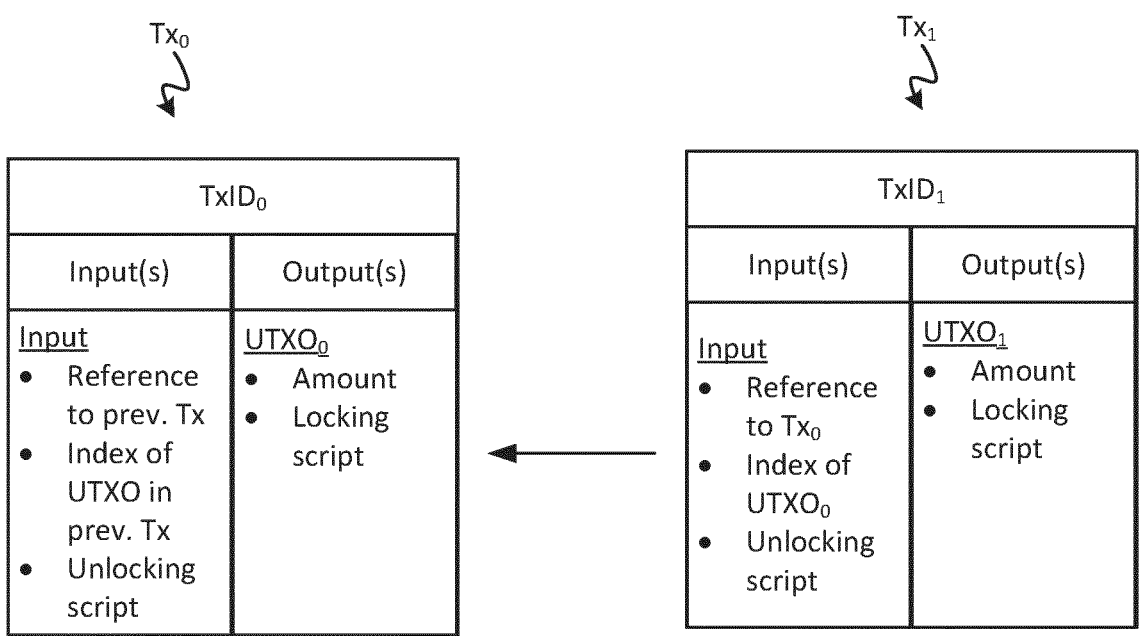

Valid transactions 103 that are broadcast on the blockchain network are recorded on the blockchain 102 by miners (also referred to as mining nodes) in blocks. A blockchain transaction 103 is used to transfer custody of an amount of a digital token. A pair of transactions 103 are shown in FIG. 1B. As shown, each transaction 103 includes, amongst other things, at least one input and at least one output. An input is a reference to an unspent transaction output (UTXO) from a previous transaction. For example, in FIG. 1B, $Tx_1$ contains an input that references a UTXO of $Tx_0$. A transaction 103 uses unspent transaction outputs (UTXOs) as inputs and distributes their value to new outputs. An output typically includes a locking condition that locks the value of that output, requiring certain data (e.g., a set of keys or other information) to be provided in an input of a new transaction 103 in order to be unlocked. Outputs can also be used to inscribe data onto the ledger. An input of a transaction 103 usually includes a digital signature that signs over a transaction 103. A chain of transactions 103 therefore includes a chain of digital signatures that maps out the entire history of valid exchanges of the digital tokens all the way back to their creation.

Returning now to FIG. 1A, the blockchain 102 begins with a "genesis block" $101g$, which is the first block 101 ever created. Each block on the blockchain 102 references a previous block, all the way back to the genesis block. That is, the nth block 101 reference the $n-1^{th}$ block 101, the $n-1^{th}$ block reference the $n-2^{th}$ block 101, and so on, back to the genesis block $101g$.

A block 101 contains an ordered list of blockchain transactions 103 and a block header 104. The block header 104 includes a Merkle root 105 that is generated by hashing the ordered list of blockchain transactions 103 into a Merkle tree, a timestamp, a reference 106 to the previous block 101 that the present block 101 builds upon and the means to validate the "proof-of-work" needed for other miners to accept the block 101 as valid. That validation means is an answer to a hash puzzle which is unique to each block 101. The blockchain protocol run by nodes of the blockchain network uses a hashing algorithm that requires miners to pre-build their candidate block $101c$ before trying to solve the puzzle. New blocks $101n$ cannot be submitted to the network without the correct answer—the process of "mining" is essentially the process of competing to be the next to find the answer that "solves" the current block 101. The hash puzzle in each block 101 is difficult to solve, but once a valid solution is found, it is very easy for the rest of the network to confirm that the solution is correct. There are multiple valid solutions for any given block 101—only one of the solutions needs to be found for the block 101 to be solved.

The following briefly describes the process of attempting to mine a new block $101n$ to the blockchain 102. When a blockchain transaction 103 is transmitted to a mining node, it is first validated according to the consensus rules of the blockchain network. If the transaction 103 is valid it is added to a pool 107 of unconfirmed transactions 103. The pool 107 is sometimes referred to as a "mempool". The mempool 107 acts as a temporary store of transactions 103 to be mined into the next block $101n$. Each mining node will have its own mempool 107, and any given transaction 103 may be included in more than one mempool 107 if it has been broadcasted to more than one mining node.

A hash function is a function that converts a string of data of arbitrary length into a fixed length value, called the hash value or a hash digest. Hashing is a one-way function, meaning it is infeasible to determine what the input data is by looking at the hash value produced from it. On the other hand, it is trivial to run the same input data through the same hash function and reproduce the same hash. Some blockchain protocols use the SHA-256 hashing algorithm, and some protocols use the SHA-256 hashing algorithm twice, i.e., the candidate block header is passed through the same hashing algorithm twice.

A Merkle tree is a data structure in the form of a tree of hash values. In the context of the blockchain 102, a transaction 103 is hashed to form a leaf node of the tree. As shown in FIG. 1A, transaction Tx1 is hashed to form leaf node D1, transaction Tx2 is hashed to form leaf node D2, and so on. Pairs of leaf nodes are concatenated and then hashed to form a node in a higher layer of the tree. For example, leaf nodes D1 and D2 are concatenated and hashed to give a node in a higher layer. Pairs of nodes in that layer are then concatenated and hashed to form a node in a yet higher layer of the tree. The process is repeated until only a single node is left, referred to as the root node, or the Merkle root 105.

A miner takes the transactions 103 it intends to include in the next block 101 and hashes them into a Merkle tree structure and includes the resulting Merkle root 105 within a candidate block header 104. The miner then hashes this candidate block header 104, attempting to find a valid proof-of-work.

A valid proof-of-work if found by hashing the candidate block header 104 (in combination with other data, as discussed below) until the result is less than another value, called the target value. The target value is automatically adjusted by the blockchain protocol so that, on average, it takes the blockchain network ten minutes to find a valid proof-of-work.

In order to change the hash value, a mining node must add additional information to the candidate block header 104. Mining nodes typically use two "nonce fields" to alter the value to be hashed, and thus alter the resulting hash value. A first nonce field 108 is included in the block header itself, and the second nonce field is included in a "coinbase transaction". A coinbase transaction is a transaction created and included in the candidate block by the mining node. Each field includes a counter parameter that can be incremented. The hash function cycles through all values of the first nonce 108 field then increments (or otherwise changes) the second nonce field, before going through all permutations of the first nonce field 108 again. Incrementing the second nonce field involves recomputing the Merkle root 105 as it modifies the hash of the coinbase transaction, which is included in the Merkle tree.

When a mining node finds a valid proof-of-work hash for a block 101 (i.e., a candidate block header 104 that hashes to a value less than the target value), it broadcasts the new block 101n to the rest of the blockchain network. The other nodes on the network accept this new block 101n only if all the transactions 103 in it are valid and have not yet been included in a block. Every block 101 is timestamped and references the hash of the block 101 preceding it, thus resulting in a chain of blocks (i.e., the blockchain 102).

The above has been described in terms of an "output-based" transaction model. An alternative type of transaction model is an "account-based" model. In this model, each transaction 103 does not define the amount of the digital token to be transferred by referring back to an unspent transaction output, but instead rather by reference to an absolute account balance. The current state of all accounts is stored by the miners separate to the blockchain 102 and is updated constantly. In such a system, transactions 103 are ordered using a running transaction tally of the account (also called the "position"). This value is signed by the sender as part of their cryptographic signature and is hashed as part of the transaction reference calculation.

Figure 2:
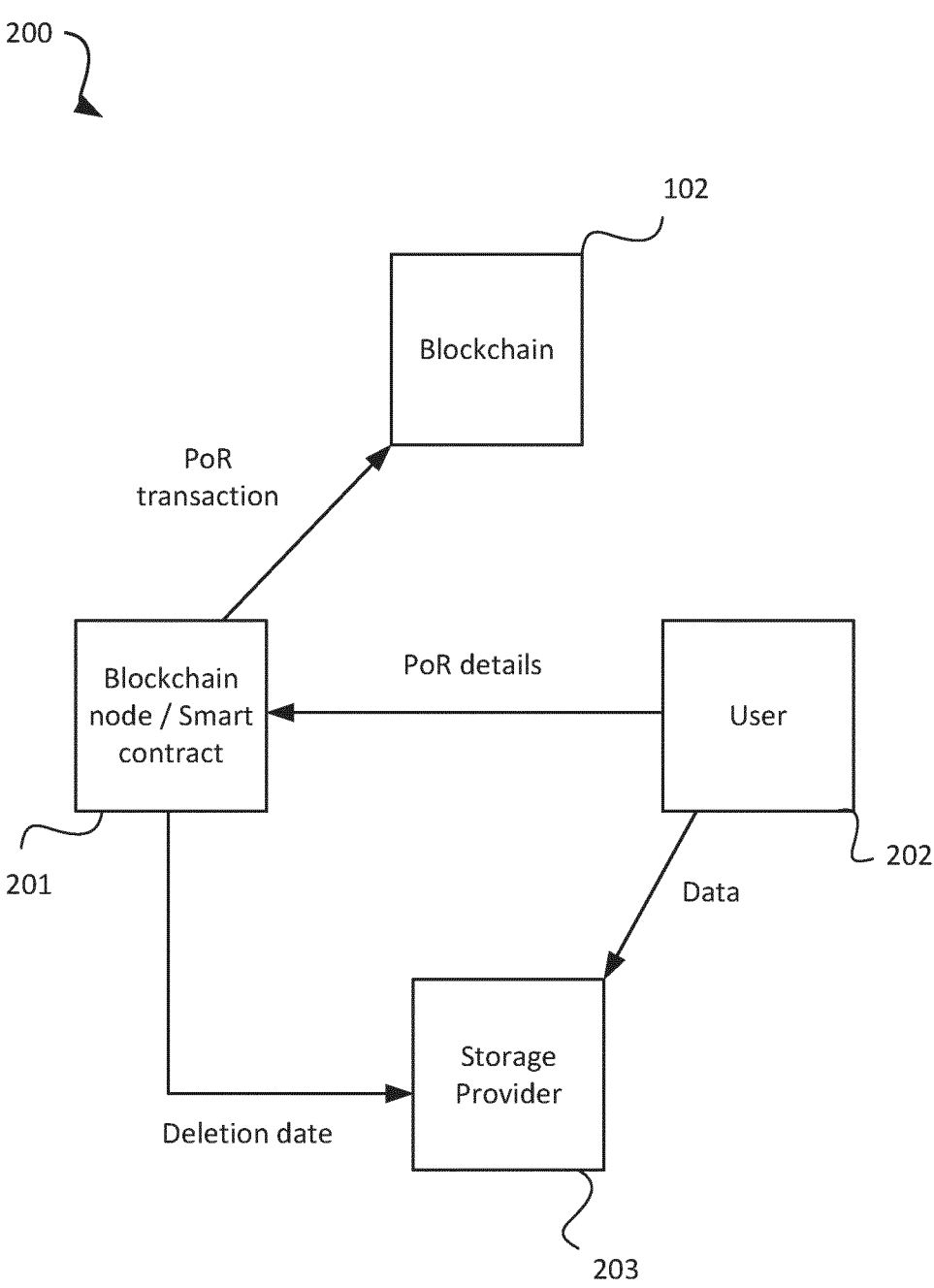

FIG. 2 schematically illustrates an example system 200 for delivering hash values from a set of hashing devices 201a, 201b to a hashing pool 202. In this example system 200 there are two hashing devices 201a, 201b but the system 200 may in general comprise any number of hashing devices 201. The system also comprises a set of blockchain client applications 203a, 203b, 203c. Whilst only three client applications 203a, 203b, 203c are shown, the system may comprise any number of client applications 203. In general, the client applications 203 are configured to submit blockchain transactions to the hashing pool 202. The hashing pool is configured to construct a block template 101c and send the block template 101c (or at least the candidate block header 104 of the block template 101c) to the hashing devices 201a, 201b. Each hashing device 201 is configured to generate candidate POW solutions based on the candidate block header 104. The system further comprises a blockchain network 204 comprising a plurality of blockchain nodes.
Proof of Data Retention FIG. 2 illustrates an example system 200 for recording retention policies on the blockhain 102. As shown, the system 200 comprises a smart contract provider (also referred to as a retention policy provider) 201. The retention policy provider may be a blockchain node. That is, the smart contract may be operated by a blockchain node. In general the retention policy provider may be any party (e.g. regulatory body, company, organisation, standards setting agency, etc.) responsible for operating the smart contract described herein. The system 200 also comprises a party 202 configured to send data to be stored at a storage provider 203. The party may take any suitable form, e.g. a user, group of users, company, organisation, university, charity, medical group, etc. The storage provider 203 is configured to store data at a storage location. The storage may take any suitable form, e.g. local storage, cloud storage, etc.

The system 200 also comprises one or more nodes of a blockchain network. For example, the nodes may be configured to implement a blockchain system as described with reference to FIGS. 1A and 1B.

As shown in FIG. 2, the user 202 is configured to send data to be stored by the storage provider 203. The data may take any suitable form, e.g. electronic documents such as company or personal records, media (e.g. audio or video) files, non-fungible tokens, and so on. The user 202 desires to record a retention policy for the data on the blockchain 150. The retention policy provider 201 operates a smart contract that is configured to issue a retention policy in the form of a blockchain transaction if a set of requirements (i.e. conditions) are met. More specifically, the smart contract defines a set of data retention requirements that must be satisfied un order to the data retention policy to be issued. The data retention requirements may be defined by the retention policy provider 201, or by a third party (not shown). For instance, the requirements may be provided by a separate regulatory body, standards committee, government organisation, etc. In some examples, the user 202 is an employee or division of a company, and the requirements are set by the company.

The smart contract may take the form of an executable program, which may be written in a high-level computer programming language. In this case, the smart contract imposes conditions on a payload containing the data retention details. If the conditions are satisfied, a retention transaction is sent to the blockchain.

The user 202 submits a set of retention details to the retention policy provider 201. The set of retention details correspond to the retention requirements. That is, the user 202 sends a retention detail for each retention requirement, such that the requirements specified by the smart contract are satisfied. The smart contract verifies that the requirements are satisfied. If they are not, a retention policy is not issued. The smart contract (or more generally the retention policy provider 201) may inform the user 202 that the verification failed. If the requirements are satisfied, the smart contract submits a blockchain transaction to the blockchain 102. In the case that the smart contract is operated by a blockhain node, the blockhain node may record the transaction directly on the blockchain 102.

The transaction (a "retention transaction") includes a retention policy which contains the set of data retention details. The retention policy may also include the data retention requirements. The retention transaction also includes the data item itself, or an encrypted version of the data item. The data item may be encrypted via hashing, or by cryptography, e.g. with a public key owned by the user 102 or the retention policy provider 201. Additionally or alternatively, the retention transaction may include a reference to the storage location of the data item.

In some examples, the smart contract is configured to generate the retention transaction from scratch. In other examples, the user 202 may send a transaction template to the smart contract, where the transaction template includes the retention details. The smart contract may verify the details satisfy the requirements, and submit the transaction template to the blockchain as the retention transaction. This may include signing the transaction template with a digital signature.

As mentioned above, the user 202 may send the data to the retention policy provider 201, i.e. in raw form. The smart contract may be configured to encrypt the data (e.g. hash the data) and include the encrypted data in the retention transaction. In other examples, the user 202 may encrypt the data (e.g. via hashing or using public key encryption) before sending to the retention policy provider 201.

In addition to sending the retention transaction to the blockchain 102, the smart contract may be configured to send to the retention transaction to the user 202 and/or the storage provider(s) 203 that store the data. Additionally or alternatively, the smart contract may generate an identifier of the retention transaction and send the identifier to the user 202 and/or the storage provider(s) 203. The identifier may be a hash or double hash of the retention transaction.

As discussed, the smart contract verifies that a set of data retention details are provided that satisfy a set of requirements for issuing the retention policy. The requirements, and therefore the details, may include one of more of: a file type and/or format; a title; a version number; a department and/or authority responsible for creating and/or storing the data; a department and/or authority responsible for approving the data retention details; a date upon which the one or more data retention details were approved; a retention period for which the data is to be stored by the storage provider 203; a deletion date upon which the data is to be deleted from the storage location.

One or more of the data retention requirements may take the form of data fields to be populated. For example, a requirement may be "storage location" or "storage provider", which would be met by providing, respectively, the storage location or storage provider of the data item. As another example, a requirement may be "effective date", which would be met by providing a date for which the retention policy is valid for. One or more of the requirements may provide one or more options to be selected. One or more of the requirements may be yes/no questions.

The smart contract may be configured to verify that each retention detail validly satisfies a particular retention requirement. This may comprise determining that the retention detail satisfies one of more of the following conditions. The retention detail may have to take a particular form, e.g. it may have to be a particular data type, such as a string or a number. In some examples, the retention detail may have to a particular value, e.g. a particular number, or a particular word, or phrase. In some examples, the retention detail may have to a particular one of a set of options (e.g. "yes" or "no"). The retention detail may have to have a minimum length and/or a maximum length. The retention detail may have to fall within a length range. The retention detail may have to satisfy other requirements.

The smart contract may be configured to detect when the retention policy expires (i.e. when the retention period specified by the user 202 has ended, or when the deletion date has arrived). In response, the smart contract may send a notification to the storage provider(s) 203, automatically triggering the storage provider(s) 203 to delete the data now that the retention policy has expired. In this way, the storage provider(s) themselves do not have to track retention periods, etc.

The smart contract may also notify the user that the retention policy has expired or is close to expiring. In this case (or without this notification), the user 202 may renew the retention policy. The retention policy may be renewed by sending a notification to the smart contract, upon which the smart contract issues a second retention transaction to the blockchain. In some examples, the user 202 sends a new set of retention details to the smart contract, and the smart contract verifies the new set of retention details satisfy the requirements for issuing a retention policy. Note that one or more of the set of retention details may remain the same. The second retention transaction may reference the previous (first) retention transaction, e.g., the second retention transaction may spend an output of the first retention transaction. Storing each retention policy for a given data item creates an immutable history of where and how the data is stored.

The user 202 may send multiple sets of retention details to the retention policy provider 201, each for a different data item. The retention details (and therefore the retention policies) may be the same or different. The smart contract may generate a retention transaction for each data item. In some examples, a single retention transaction may include the retention details of multiple different data items.

Figure 3:
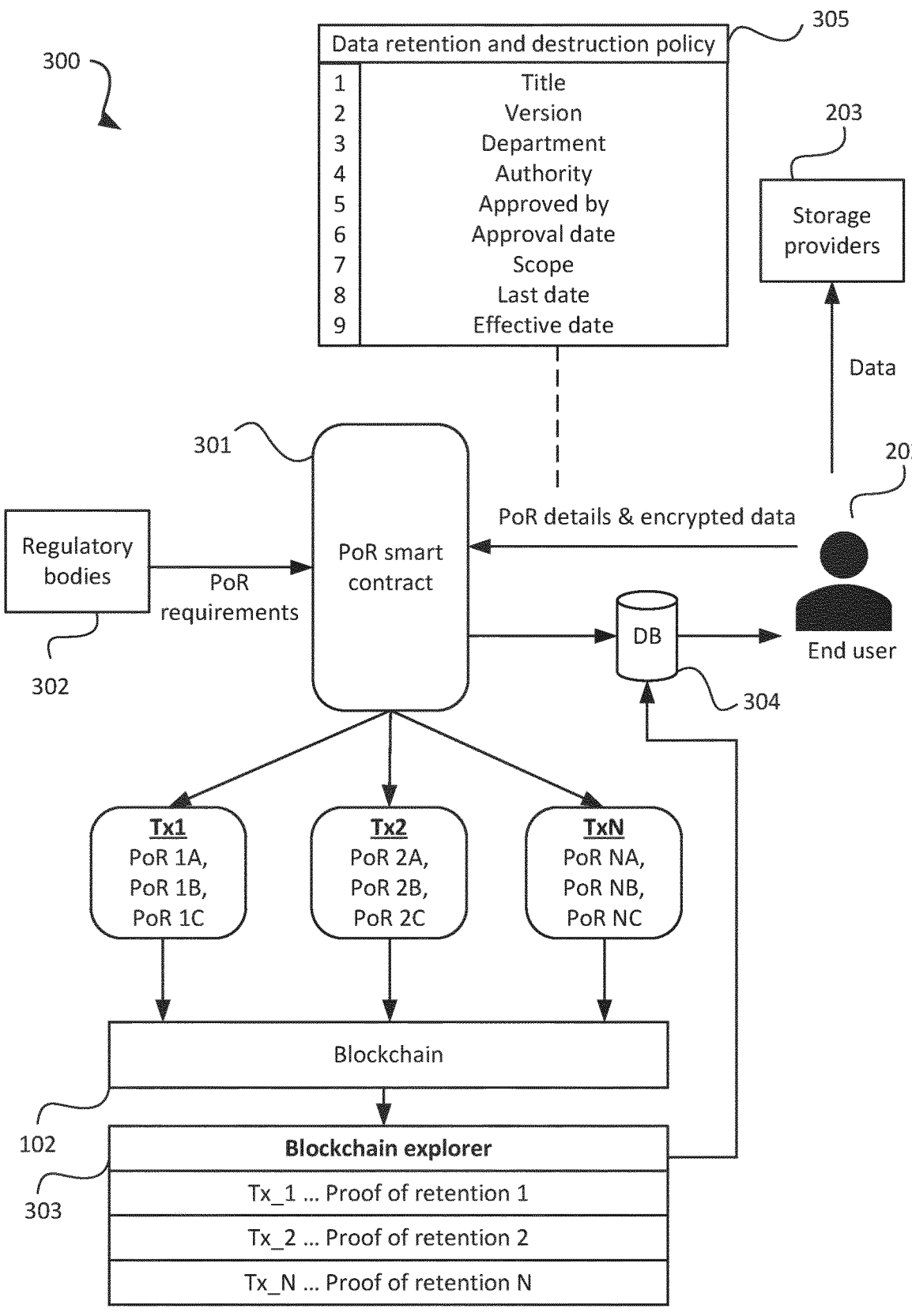

FIG. 3 illustrates an example system 300/process for recording retention policies on the blockchain 102. One or more regulatory bodies 302 provide retention requirements to the smart contract 301. The user 202 submits retention details and (encrypted) data to the smart contract 301. The data is sent to be stored by the storage providers 203. The smart contract verifies the details and sends a first retention transaction (Tx1) to the blockchain 102. The retention transaction can be searched and retrieved, e.g. using a blockchain explorer 303. In some examples, the retention transaction is stored in a database 304 which can be queried by the user 202 and/or third parties, such as the storage providers 203. An example retention policy 305 is shown in FIG. 3. The user 202 may send, to the smart contract 301, N sets of retention details for N data items. The smart contract may issues N retention transactions, one for each data item. Similarly, the retention details of more than one data item may be stored in the same retention transaction.

The system 300 shown in FIG. 3 allows third parties (e.g. an end user 202 such as an IT technician, data manager, executive, etc., or a regulatory body 302) to review retention policies (PoRs) listed with all the necessary data. This can be done by querying a blockchain explorer 303 directly or via a database 304.

In this way, the risk of incorrect entry in the retention policy is avoided. This is because the smart contract is self-verifying and self-enforcing. Furthermore, data retention can be automated by calling data from the blockchain explorer 303 (e.g. via a user API) to the operating/production system. In this way, the automation of the process will avoid the problem of participation of a central person who spends time and has the possibility of error in the execution process. The user API can also be directed to send the action script (i.e. the result of executing the smart contract) directly to the storage provider, e.g. a cloud data warehouse. Securing retention data using a blockchain reduces the risk of data loss because it does not allow one to access, delete or move data to another medium if the conditions of the smart contract are not met. The repeated process of physical query by the user about the number of backups to be performed is avoided as this is now processed by automation from the smart contract script on the data at the time that is recorded. This can be checked through the blockchain explorer 303.

The database 304 stores the retention policies issued by the smart contract 301. These may be policies related to a particular user 202 (e.g. a particular organsiation). The retention policies may be stored as retention transactions. In other words, the database may store the retention transactions from which the retention policies may be extracted. Alternatively, the database may store only the retention policies. The database 304 allows the user 202 to quickly and efficiently find a retention policy for a data item, e.g. to provide to a regulatory body 302 or other third party. In the case that a retention policy is updated one or more times, the database may store the history of the retention policies, or only the most recent policy. The database 304 allows the user to find the most up-to-date version of the retention policy. The database 304 may store a retention policy together with (i.e. mapped to) the transaction identifier of the retention transaction. This allows the retention transaction to be easily found.

Further Remarks

The retention policy provider 201 and the user 202 operate respective computer equipment. The computer equipment of each of these entities comprises respective processing apparatus comprising one or more processors, e.g., one or more CPUs, GPUs, other accelerator processors, application specific processors, and/or FPGAs. The computer equipment of each entity further comprises memory, i.e., computer-readable storage in the form of a non-transitory computer-readable medium or media. This memory may comprise one or more memory units employing one or more memory media, e.g., a magnetic medium such as hard disk; an electronic medium such as an SSD, flash memory or EEPROM; and/or an optical medium such as an optical disc drive. The memory on the computer equipment of each entity may store software comprising at least one client application arranged to run on the processing apparatus. It will be understood that any action attributed herein to a given entity 201, 202 may be performed using the software run on the processing apparatus of the respective computer equipment. The computer equipment of each entity comprises at least one user terminal, e.g., a desktop or laptop computer, a tablet, a smartphone, or a wearable device such as a smartwatch. The computer equipment of each entity may also comprise one or more other networked resources, such as cloud computing resources accessed via the user terminal.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

More generally, according to one aspect disclosed herein there is provided a computer-implemented method of using a blockchain to provide proof of a data retention policy, wherein a smart contract defines one or more respective data retention requirements for storing data items at a storage location, and wherein the method comprises:

receiving, from a party, a) a first data item and/or an encrypted version of the first data item, wherein the first data item is to be stored at the storage location, and b) one or more respective data retention details of a first retention policy relating to the first data item;

supplying, to a smart contract, a) the first data item and/or the encrypted version of the first target data item, and b) the one or more respective data retention details of the first retention policy; and executing the smart contract, wherein the smart contract is configured to, when executed:

determine whether the one or more respective data retention details of the first retention policy satisfy the one or more respective data retention requirements; and if the one or more respective data retention details the first retention policy are determined to satisfy the one or more respective data retention requirements, submit a first blockchain transaction to the blockchain, wherein the first blockchain transaction comprises the one or more data retention details of the first retention policy and at least one of: i) the first data item, ii) the encrypted version of the first data item, iii) a reference to where to the first data item is stored at the storage location.

In embodiments, said receiving may comprise receiving the first blockchain transaction, wherein the first blockchain transaction comprises a) the first target data item and/or encrypted version of the first target data item, and b) the one or more respective data retention details of the first retention policy, and wherein said supplying comprises supplying the first blockchain transaction to the smart contract.

In embodiments, the smart contract may be configured to generate the first blockchain transaction.

In embodiments, said receiving may comprise receiving the first data item, and wherein the smart contract may be configured to generate the encrypted version of the first data item.

In embodiments, the encrypted version of the first data item may comprise a hash of the target data item.

In embodiments, the encrypted version of the first target data item may be generated using public key encryption.

In embodiments, the method may comprise sending the first blockchain transaction to the party and/or a storage provider of the storage location.

In embodiments, the smart contract may be configured to generate an identifier of the first blockchain transaction, and wherein the method may comprise sending the identifier of the first blockchain transaction to the party and/or the storage provider of the storage location.

In embodiments, the one or more respective data retention details of the first retention policy may comprise one or more of:

a file type of the first data item;
  a title of the first data item;
  a version of the first data item;
  a department and/or authority responsible for creating and/or storing the first data item;
  a department and/or authority responsible for approving the one or more respective data retention details of the first retention policy;
  a date upon which the one or more respective data retention details were approved;
  a retention period for which the first data item is to be stored at the storage location;
  a deletion date upon which the first data item is to be deleted from the storage location.

In embodiments, the one or more respective data retention details of the first retention policy may comprise the retention period and/or the deletion date, and wherein the smart contract may be configured to:

detect when the retention period is over and/or when the deletion date arrives; and cause a notification to be sent to the storage provider to delete the first data item from the storage location.

In embodiments, the one or more respective data retention details may comprise the retention period and/or the deletion date, and wherein the method may comprise:

receiving, from the party, one or more respective data retention details of an updated first retention policy, and wherein the smart contract is configured to submit a second blockchain transaction to the blockchain, wherein the second blockchain transaction comprises the one or more data retention details of the updated first retention policy and at least one of: i) the first data item, ii) the encrypted version of the first data item, iii) the reference to where to the first data is stored at the storage location.

In embodiments, the second blockchain transaction may reference the first blockchain transaction.

In embodiments, the method may comprise:

receiving, from the party, a) a second data item and/or an encrypted version of the second data item, wherein the second data item is to be stored at the storage location, and b) one or more respective data retention details of a second retention policy;

supplying, to the smart contract, a) the second data item and/or the encrypted version of the second data item, and b) the one or more respective data retention details of the second retention policy; and executing the smart contract, wherein the smart contract is configured to, when executed:

determine whether the one or more respective data retention details of the second retention policy satisfy the one or more respective data retention requirements; and if the one or more respective data retention details of the second retention policy are determined to satisfy the one or more respective data retention requirements, submit a third blockchain transaction to the blockchain, wherein the third blockchain transaction comprises the one or more data retention details of the second retention policy and at least one of: i) the second data item, ii) the encrypted version of the second data item, iii) a reference to where to the second data is stored at the storage location.

In embodiments, the first and third blockchain transactions may be the same blockchain transaction.

In embodiments, the first and second retention policies may be different retention policies.

In embodiments, the method may be performed by a blockchain node.

According to another aspect disclosed herein there is provided computer equipment comprising: memory comprising one or more memory units; and processing apparatus comprising one or more processing units, wherein the memory stores code arranged to run on the processing apparatus, the code being configured so as when on the processing apparatus to perform the method of any of the embodiments described herein.

According to another aspect disclosed herein there is provided a computer program embodied on computer-readable storage and configured so as, when run on one or more processors, to perform the method of any of the embodiments described herein.

The invention claimed is:

1. A computer-implemented method of using a blockchain to provide proof of a data retention policy, wherein a smart contract defines one or more respective data retention requirements for storing data items at a storage location, and wherein the method comprises:

receiving, from a party, a) a first data item and/or an encrypted version of the first data item, wherein the first data item is to be stored at the storage location, and b) one or more respective data retention details of a first retention policy relating to the first data item;

supplying, to a smart contract, a) the first data item and/or the encrypted version of the first data item, and b) the one or more respective data retention details of the first retention policy; and executing the smart contract, wherein the smart contract is configured to, when executed:

determine whether the one or more respective data retention details of the first retention policy satisfy the one or more respective data retention requirements; and if the one or more respective data retention details of the first retention policy are determined to satisfy the one or more respective data retention requirements, submit a first blockchain transaction to the blockchain, wherein the first blockchain transaction comprises the one or more data retention details of the first retention policy and at least one of: i) the first data item, ii) the encrypted version of the first data item, iii) a reference to where the first data item is stored at the storage location.

2. The method of claim 1, wherein said receiving comprises receiving the first blockchain transaction, wherein the first blockchain transaction comprises a) the first target data item and/or the encrypted version of the first target data item, and b) the one or more respective data retention details of the first retention policy, and wherein said supplying comprises supplying the first blockchain transaction to the smart contract.

3. The method of claim 1, wherein the smart contract is configured to generate the first blockchain transaction.

4. The method of claim 1, wherein said receiving comprises receiving the first data item, and wherein the smart contract is configured to generate the encrypted version of the first data item.

5. The method of claim 1, wherein the encrypted version of the first target data item is generated using public key encryption.

6. The method of claim 1, comprising sending the first blockchain transaction to the party and/or a storage provider of the storage location.

7. The method of claim 1, wherein the smart contract is configured to generate an identifier of the first blockchain transaction, and wherein the method comprises sending the identifier of the first blockchain transaction to the party and/or the storage provider of the storage location.

8. The method of claim 1, wherein the one or more respective data retention details of the first retention policy comprise one or more of:

a file type of the first data item;

a title of the first data item;

a version of the first data item;

a department and/or authority responsible for creating and/or storing the first data item;

a department and/or authority responsible for approving the one or more respective data retention details of the first retention policy;

a date upon which the one or more respective data retention details were approved;

a retention period for which the first data item is to be stored at the storage location; and a deletion date upon which the first data item is to be deleted from the storage location.

9. The method of claim 8, wherein the one or more respective data retention details of the first retention policy comprise the retention period and/or the deletion date, and wherein the smart contract is configured to:

detect when the retention period is over and/or when the deletion date arrives; and cause a notification to be sent to the storage provider to delete the first data item from the storage location.

10. The method of claim 8, wherein the one or more respective data retention details comprise the retention period and/or the deletion date, and wherein the method comprises:

receiving, from the party, one or more respective data retention details of an updated first retention policy, and wherein the smart contract is configured to submit a second blockchain transaction to the blockchain, wherein the second blockchain transaction comprises the one or more data retention details of the updated first retention policy and at least one of: i) the first data item, ii) the encrypted version of the first data item, iii) the reference to where the first data item is stored at the storage location.

11. The method of claim 1, comprising:

receiving, from the party, a) a second data item and/or an encrypted version of the second data item, wherein the second data item is to be stored at the storage location, and b) one or more respective data retention details of a second retention policy;

supplying, to the smart contract, a) the second data item and/or the encrypted version of the second data item, and b) the one or more respective data retention details of the second retention policy; and executing the smart contract, wherein the smart contract is configured to, when executed:

determine whether the one or more respective data retention details of the second retention policy satisfy the one or more respective data retention requirements; and if the one or more respective data retention details of the second retention policy are determined to satisfy the one or more respective data retention requirements, submit a third blockchain transaction to the blockchain, wherein the third blockchain transaction comprises the one or more data retention details of the second retention policy and at least one of: i) the second data item, ii) the encrypted version of the second data item, iii) a reference to where the second data item is stored at the storage location.

12. The method of claim 11, wherein the first and third blockchain transactions are the same blockchain transaction.

13. The method of claim 11, wherein the first and second retention policies are different retention policies.

14. The method of claim 1, wherein the method is performed by a blockchain node.

15. Computer equipment comprising:

memory comprising one or more memory units; and processing apparatus comprising one or more processing units, wherein the memory stores code arranged to run on the processing apparatus, the code being configured so as when on the processing apparatus receiving, from a party, a) a first data item and/or an encrypted version of the first data item, wherein the first data item is to be stored at a storage location, and b) one or more respective data retention details of a first retention policy relating to the first data item;

supplying, to a smart contract, a) the first data item and/or the encrypted version of the first data item, and b) the one or more respective data retention details of the first retention policy; and executing the smart contract, wherein the smart contract is configured to, when executed: determine whether the one or more respective data retention details of the first retention policy satisfy one or more respective data retention requirements of the smart contract; and if the one or more respective data retention details of the first retention policy are determined to satisfy the one or more respective data retention requirements, submit a first blockchain transaction to a blockchain, wherein the first blockchain transaction comprises the one or more data retention details of the first retention policy and at least one of: i) the first data item, ii) the encrypted version of the first data item, iii) a reference to where the first data item is stored at the storage location.

16. A computer program embodied on a non-transitory computer-readable storage and configured so as, when run on one or more processors, to perform steps comprising:

receiving, from a party, a) a first data item and/or an encrypted version of the first data item, wherein the first data item is to be stored at a storage location, and b) one or more respective data retention details of a first retention policy relating to the first data item; supplying, to a smart contract, a) the first data item and/or the encrypted version of the first data item, and b) the one or more respective data retention details of the first retention policy; and executing the smart contract, wherein the smart contract is configured to, when executed: determine whether the one or more respective data retention details of the first retention policy satisfy one or more respective data retention requirements of the smart contract; and if the one or more respective data retention details of the first retention policy are determined to satisfy the one or more respective data retention requirements, submit a first blockchain transaction to a blockchain, wherein the first blockchain transaction comprises the one or more data retention details of the first retention policy and at least one of: i) the first data item, ii) the encrypted version of the first data item, iii) a reference to where the first data item is stored at the storage location.

* * * * *